March 13, 1962 F. E. HENNING 3,024,856
ROCK AND EARTH-DRILLING AUGER WITH INTERCHANGEABLE CUTTING INSERTS
Filed Nov. 25, 1957 2 Sheets-Sheet 2
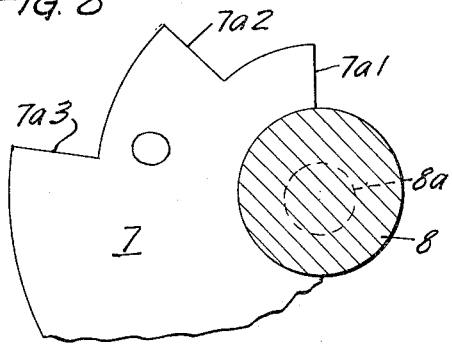
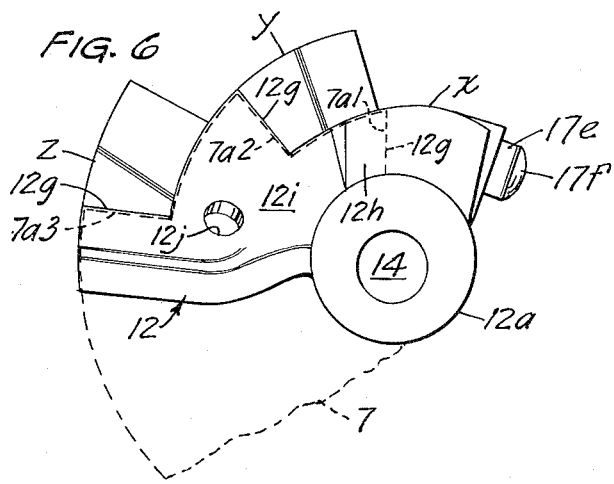
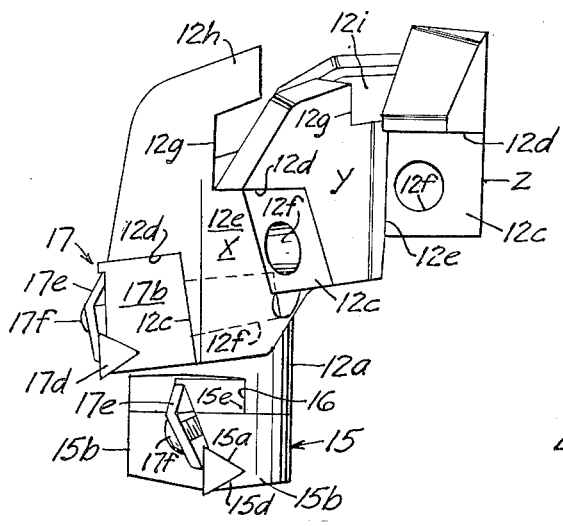
INVENTOR
FREDERICK E. HENNING
BY Williamson & Palmatier
ATTORNEYS

United States Patent Office 3,024,856
Patented Mar. 13, 1962

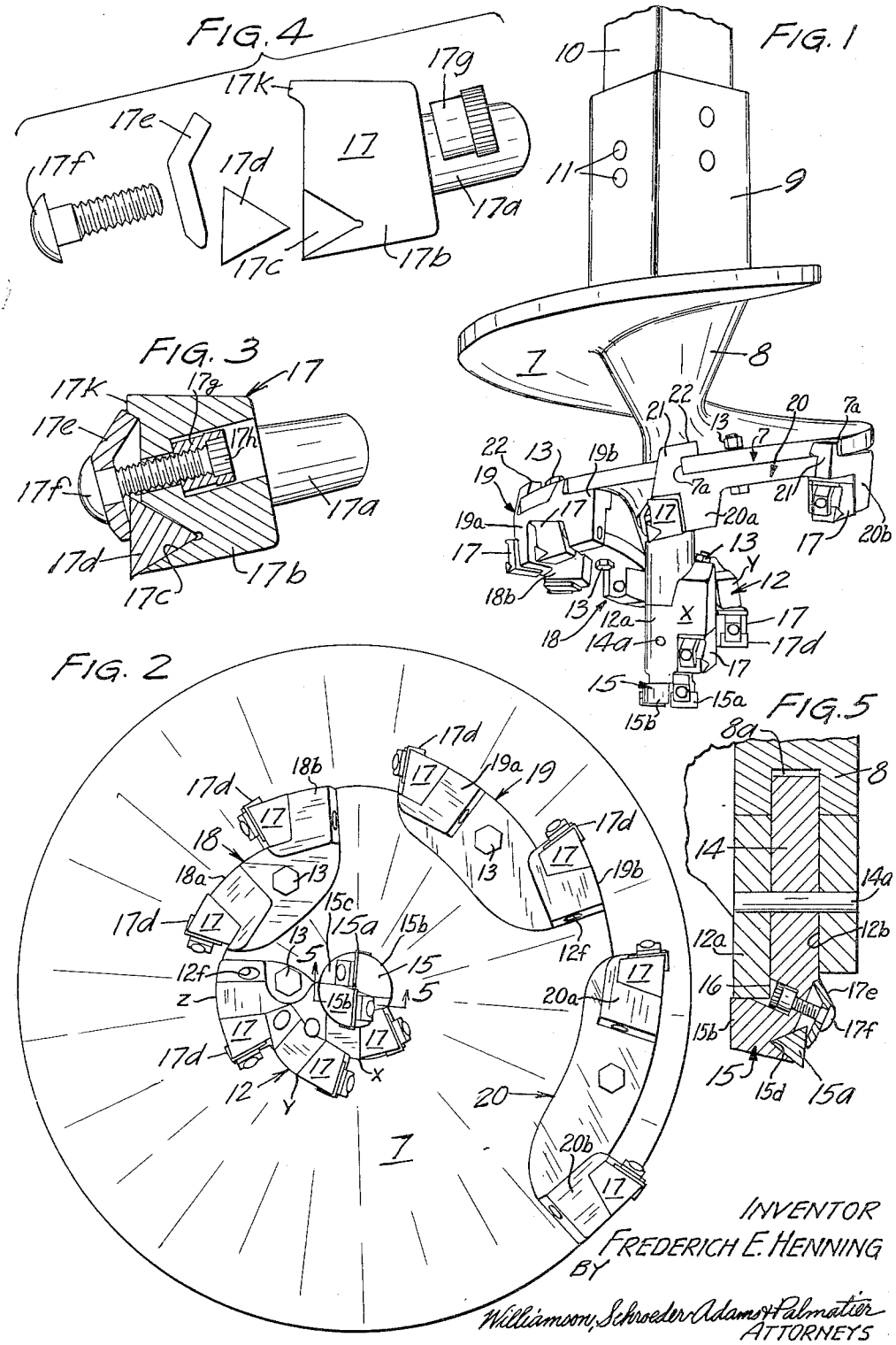

3,024,856
ROCK AND EARTH-DRILLING AUGER WITH INTERCHANGEABLE CUTTING INSERTS
Frederick E. Henning, 1638 8th Ave. S., Fargo, N. Dak.
Filed Nov. 25, 1957, Ser. No. 698,560
3 Claims. (Cl. 175—391)

This invention relates generally to rock and earth-drilling augers, and more particularly to such an auger having a plurality of cutters, each provided with a hard cutting bit insert which is particularly adapted to facilitate interchangeability and replacement.

It is an object of my present invention to provide a rock and earth-drilling auger incorporating a plurality of cutters, each provided with an easily interchangeable cutting bit insert, whereby a sharp cutting edge may be easily and quickly provided in a facile and inexpensive manner.

More specifically, it is an object to provide a rock and earth-drilling auger having a spiral body with a plurality of cutters mounted thereon, each cutter being provided with an interchangeable hard cutting insert with screw-clamping means for removably holding said insert in a selected cutting position.

These and other objects and advantages of my invention will more fully appear from the following description, made in connection with the accompanying drawings, wherein like reference characters refer to the same or similar parts throughout the several views, and in which:

FIG. 1 is a front elevational view of an auger embodying my new invention.
FIG. 2 is a bottom plan view thereof.
FIG. 3 is a longitudinal substantially vertical sectional view of a cutter assembly per se.
FIG. 4 is an exploded side elevational view of the cutter assembly shown in FIG. 3.
FIG. 5 is a fragmentary vertical sectional view taken substantially along the line 5—5 of FIG. 2, and showing the lower portion of the central cutting tip.
FIG. 6 is a top plan view on an enlarged scale of the lowermost bit-mounting member with one cutter assembly and the bottom cutter tip assembly mounted thereon, and with two cutter assemblies removed therefrom. FIG. 7 is a side elevational view on an enlarged scale of the mounting member, cutter assembly and tip assembly shown in FIG. 6. FIG. 8 is a top plan view on an enlarged scale of the lower portion of the spiral body on which the lowermost bit-mounting member illustrated in FIGS. 6 and 7 is mounted.

As shown in the accompanying drawing, I provide a rock and earth-drilling auger having, in the form shown, a downwardly tapered spiral body 7 with a central supporting shaft 8 and an upper connecting hub 9, to which the rotary driving shaft 10 is non-rotatably connected, as by the cross pin 11.

The outer marginal edge portion of the tapered spiral body 7 is stepped to form a plurality of spaced shoulders 7a adapted to receive in interlocked relation the removable bit mounting members. A bit mounting member 12 is removably attached to the lower portion of the auger. The member 12 includes a hub portion 12a having a vertical bore 12b extending therethrough. The member 12 is also provided with a series of three mounting portions or heads X, Y and Z which are spirally arranged in progressively increasing radii from the axis of rotation and are progressively stepped with relation to each other. The mounting heads X, Y and Z are each provided with a forwardly facing three-sided recess (best seen in FIG. 7) defined by the back wall 12c, the top wall 12d and the inner side wall 12e, which recesses are adapted to receive the cutter assembly hereinafter to be described.

A tapered hole 12f is also provided in each mounting head which extends entirely therethrough from front to rear. Each mounting head has an upstanding shoulder 12g which abuts with one of the shoulders 7a of the spiral body 7. The leading head X is also provided with a rearwardly extending lip 12h which overlies the top marginal edge portion of the spiral shoulder with which X abuts. The mounting member 12 also has a portion 12i which underlies and is overlapped by the spiral body 7 and is removably attached thereto by means of the attachment bolt 13 which extends through the hole 12j in the mounting member and hole 7b in the spiral body.

Thus, when the mounting member 12 is mounted on the auger, the lowermost shoulder 7a1 on the spiral body abuts with the shoulder 12g of head X and is overlapped by the lip 12h, the shoulder 7a2 abuts with shoulder 12g of head Y, and shoulder 7a3 abuts with shoulder 12g of head Z.

A cutter tip assembly indicated in the entirety by numeral 15, is removably mounted on the hub 12a to provide the initial penetrating and cutting action of the auger. The cutter tip assembly includes a vertically disposed mounting pin 14 which is enclosed within the bore 12b of the hub 12a and projects above said hub whereby the top portion of the pin 14 is received by and seated in the recess 8a provided on the lower end of the central supporting shaft 8. A cross pin 14a extends laterally through the hub 12a and pin 14 and retains the cutter tip assembly on the mounting member 12, as best shown in FIG. 5. It will also be seen in FIGS. 1 and 5 that when the mounting member 12 is mounted on the auger, the lower end of the central supporting shaft 8 is in abutting relationship with the top of the hub 12a, with the hub 12a constituting an extension and continuation of said central supporting shaft. The cutter tip assembly also includes a pair of diametrically opposed mounting heads 15b which have recesses 15c therebetween to enable the cutting bit inserts 15a of triangular cross section to be mounted in the triangular recesses 15b provided in the leading face of each of the mounting heads 15b, which bits are removably and interchangeably retained by clamping means hereinafter to be described. The lower ends of the hub 12a are stepped as at 16 and the mounting heads 15b are provided with upstanding abutment shoulders 15e which cooperatively engage the stepped portions 16 to prevent relative rotation therebetween and provide positive exceptionally strong driving connection between the mounting member 12 and the cutter tip assembly 15.

A plurality of intermediate cutter asemblies 17, such as the one illustrated in FIGS. 3 and 4, are provided in the recesses of the mounting heads of mounting member 12 and are removably connected therewith in any suitable manner, such as by the tapered mounting plug 17a, illustrated in FIGS. 3 and 4 which is press-fitted into the tapered hole 12f in the mounting head. A bit-mounting body 17b is, in the form shown, integrally formed with the mounting plug 17a, and has a polygonal recess 17c formed in the lower forward edge thereof to receive a hardened cutting bit insert member 17d of a similar cross-sectional shape, but being of somewhat larger dimensions than the recess 17c, so that the forward edge portion thereof projects forwardly of the body 17b, as illustrated. Each of the cutting bit inserts 17d is removably held in place by the retaining clamp 17e and the clamping screws 17f extending therethrough and positively locked to the body 17b of the round retaining nut 17g having a polygonal socket 17h formed therein to facilitate tightening and loosening thereof. The cutting bit inserts 15a provided in the cutting tip 15 are retained therein in a generally similar manner to that just described.

The cutting bit inserts are positioned in progressively increasing cutting radii, the farther up the mounting member they are disposed. In the form shown, the cutting zone of each succeeding cutting bit overlaps the cutting zone of the preceding bit by approximately half and only the outer half of the cutter element produces any appreciable cutting action, so that only half of the length of the cutting edge is worn away during the cutting operation. With the easily removable cutting bit inserts 15a and 17d it is, of course, a relatively simple matter to merely turn the insert end for end, or rotate the insert through approximately 120° to present an entirely new cutting edge, so that each intermediate cutter insert 17d provides six separate cutting edges, and each of the tip cutter inserts 15a provides three separate cutting edges.

The generally cylindrical nut 17g, having the interior socket head 17h, is unscrewed from the bolt 17f to release the retaining clamp 17e from the insert 17d. An abutment shoulder 17k is provided for engagement with the upper end of the retaining clamp 17e, as best shown in FIGS. 3 and 4. This positively holds the lower edge of the clamp downwardly in overlying relation to the upper marginal edge portions of the insert 17d.

In the form of the invention illustrated, additional mounting members respectively designated by the numerals 18, 19, and 20, each having a pair of recessed mounting heads 18a—18b, 19a—19b and 20a—20b, respectively, corresponding to the previously described mounting heads X, Y and Z are mounted on the periphery of the tapered portion of the spiral body 7, as best shown in FIGS. 1 and 2 and fastened thereto by the bolts 13. The cutter assemblies 17 are connected to the mounting members 18, 19 and 20 by means of the tapered shank 17a, as previously described in connection with the lower mounting member 12 and seated in the recesses of their respective mounting heads. The mounting members 18, 19 and 20 are interfitted with the periphery of the spiral body 7, as by the steps 7a formed in said body and the upwardly extending abutments 21 corresponding to the shoulders 12g and lips 22 corresponding to the lip 12h formed on the mounting members for engagement with said steps. Thus, the mounting members are mounted on the auger in a manner generally similar to that disclosed in my prior U. S. Patent No. 2,594,261, issued April 22, 1952.

It will be seen that I have provided a highly ingenious, yet relatively simple, cutting bit assembly in combination with a tapered earth and rock-drilling auger which greatly facilitates the drilling operation by speeding the replacement operation after a cutting bit has become dull and permits the use of the relatively brittle, carbide material which is so effective in cutting hard surfaces, since the cooperatively-shaped recess 17c provides the necessary backing support for the cutter bit insert 17d to prevent the same from breaking and minimizes the chipping thereof, frequently produced by the extremely high drilling pressures required for rock drilling operations.

In the form shown, an insert of triangular cross-sectional shape has been illustrated. This permits the cutting edge of the insert to be projected forwardly and downwardly from the supporting body 17b by providing an insert somewhat larger than the recess 17c.

It will, of course, be understood that various changes may be made in the form, details, arrangement and proportions of the parts without departing from the scope of my invention, which consists of the matter shown and described herein and set forth in the appended claims.

What I claim is:

1. A rock and earth drilling auger comprising a downwardly spiraled body, bit mounting means securely anchored thereto providing a series of recesses on the peripheral edge of said spiral body progressively downwardly stepped with relation to each other, said recesses facing the direction of rotational movement, a bit supporting block mounted in each recess and substantially entirely overlain and backed by the portions of the bit mounting means defining said recess and providing a working face generally radially parallel to the axis of rotation of said body and facing the direction of rotational movement, a bit receiving recess formed in the working face of said block, a bit insert having a cross-section corresponding to said bit receiving recess and seated substantially entirely therein, said seated bit insert providing a cutting edge generally perpendicular to said axis of rotation, and removable clamping means overlying said working face and engaging said bit insert to removably hold it in its respective bit receiving recess and facilitate interchanging of said insert.

2. The structure as set forth in claim 1 wherein said bit receiving recess is of triangular cross section, said bit receiving recess providing two outwardly diverging bit engaging surfaces communicating with said working face, and said bit insert being of substantially triangular cross section, the edges formed by the sides of said triangular insert providing three interchangeable cutting edges for selective disposition on a line generally perpendicular to said axis of rotation.

3. The structure set forth in claim 1 wherein said clamping means include a clamping element overlying said insert and the working face of said block and fastening means for removably securing said clamping element to said block, said fastening means including an elongate first fastening element adapted to engage said clamping element and penetrate said block and extend into a hollow portion of said block, said hollow portion opening into the back side of said block, and a second fastening element adapted for removable insertion into said hollow portion for cooperatively engaging said first fastening element to secure said clamping element to said blocks.

References Cited in the file of this patent
UNITED STATES PATENTS

| | | |
|---|---|---|
| 914,966 | Mayer et al. | Mar. 9, 1909 |
| 1,059,463 | Hess | Apr. 22, 1913 |
| 1,114,497 | MacDonald | Oct. 20, 1914 |
| 2,022,194 | Galvin | Nov. 26, 1935 |
| 2,123,213 | Simmons | July 12, 1938 |
| 2,472,892 | George | June 14, 1949 |
| 2,494,188 | Meaner | Jan. 10, 1950 |
| 2,594,261 | Henning | Apr. 22, 1952 |
| 2,680,597 | Brown | June 8, 1954 |
| 2,780,439 | Kandle | Feb. 5, 1957 |